United States Patent
Levijoki et al.

(10) Patent No.: US 9,181,844 B2
(45) Date of Patent: Nov. 10, 2015

(54) DIAGNOSTIC SYSTEM AND METHOD FOR AN OXYGEN SENSOR POSITIONED DOWNSTREAM FROM A CATALYTIC CONVERTER

(75) Inventors: Stephen Paul Levijoki, Swartz Creek, MI (US); Michael John Dokter, Okemos, MI (US); John W. Siekkinen, Novi, MI (US); Jeffry A. Helmick, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 421 days.

(21) Appl. No.: 13/243,019

(22) Filed: Sep. 23, 2011

(65) Prior Publication Data
US 2012/0317959 A1  Dec. 20, 2012

Related U.S. Application Data

(60) Provisional application No. 61/497,829, filed on Jun. 16, 2011.

(51) Int. Cl.
*F01N 3/00* (2006.01)
*F01N 11/00* (2006.01)

(52) U.S. Cl.
CPC .......... *F01N 11/007* (2013.01); *F01N 2550/02* (2013.01); *F01N 2560/025* (2013.01); *F01N 2900/0422* (2013.01); *Y02T 10/47* (2013.01)

(58) Field of Classification Search
CPC ....... F01N 11/007; F01N 11/00; F01N 9/005; F01N 11/002; F01N 3/20; F01N 2900/0422; F01N 2560/025; F01N 2550/02; F02D 41/1441; F02D 41/1495; F02D 41/1474; G01L 3/26; G01M 15/102; Y02T 10/47

USPC .................. 60/272–324; 73/114.69, 117.69, 73/114.75, 114.72, 114.73; 123/688, 690; 701/109, 114; 702/182, 183, 185
See application file for complete search history.

(56) References Cited

U.S. PATENT DOCUMENTS 5,331,808 A * 7/1994 Koike ............................. 60/276
5,357,791 A   10/1994 Gee et al.
5,431,011 A * 7/1995 Casarella et al. ............... 60/274
(Continued)

FOREIGN PATENT DOCUMENTS

CN   102061973 A   5/2011
DE   69405615      1/1998
(Continued)

OTHER PUBLICATIONS

Office Action dated Oct. 25, 2013 from the German Patent Office for German Patent Application No. 10 2012 209 682.5; 7 pages.
(Continued)

*Primary Examiner* — Audrey K Bradley
*Assistant Examiner* — Kelsey Stanek

(57) ABSTRACT

A system according to the principles of the present disclosure includes a diagnostic execution module and a diagnostic disabling module. The diagnostic execution module diagnoses a fault in at least one of an oxygen sensor and a catalytic converter based on input received from the oxygen sensor. The diagnostic disabling module disables the diagnosing based on at least one of a temperature of the catalytic converter and a mass flow rate of air flowing through the catalytic converter.

27 Claims, 4 Drawing Sheets

(56) References Cited

U.S. PATENT DOCUMENTS

| | | | |
|---|---|---|---|
| 5,533,332 A * | 7/1996 | Uchikawa | 60/274 |
| 5,591,905 A * | 1/1997 | Fujimoto et al. | 73/114.75 |
| 5,706,652 A * | 1/1998 | Sultan | 60/274 |
| 5,787,705 A * | 8/1998 | Thoreson | 60/274 |
| 5,842,339 A * | 12/1998 | Bush et al. | 60/274 |
| 5,979,160 A * | 11/1999 | Yashiki et al. | 60/276 |
| 6,116,021 A * | 9/2000 | Schumacher et al. | 60/274 |
| 6,532,734 B1 * | 3/2003 | Nader et al. | 60/277 |
| 6,668,545 B2 * | 12/2003 | Brown | 60/284 |
| 8,538,721 B2 | 9/2013 | Sacco et al. | |
| 2007/0283749 A1 | 12/2007 | Webb et al. | |
| 2011/0106411 A1 * | 5/2011 | Anilovich et al. | 701/109 |
| 2011/0153260 A1 | 6/2011 | Sacco et al. | |
| 2012/0226424 A1 * | 9/2012 | Adams | 701/93 |

FOREIGN PATENT DOCUMENTS

| | | |
|---|---|---|
| DE | 60016853 | 12/2005 |
| GB | 2475318 | 5/2011 |

OTHER PUBLICATIONS

Schenk, C. and Laroo, C., "NOx Adsorber Aging on a Heavy-Duty On-Highway Diesel Engine—Part One," SAE Technical Paper 2003-01-0042, 2003, doi:10.4271/2003-01-0042.

* cited by examiner

DIAGNOSTIC SYSTEM AND METHOD FOR AN OXYGEN SENSOR POSITIONED DOWNSTREAM FROM A CATALYTIC CONVERTER

CROSS-REFERENCE TO RELATED APPLICATIONS

This application claims the benefit of U.S. Provisional Application No. 61/497,829, filed on Jun. 16, 2011. The disclosure of the above application is incorporated herein by reference in its entirety.

FIELD

The present disclosure relates to diagnostic systems and methods for an oxygen sensor positioned downstream from a catalytic converter.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An oxygen sensor may be positioned downstream from a catalytic converter to measure oxygen levels in exhaust gas produced by an engine. The oxygen levels and an air/fuel ratio of the engine may be determined based on an output voltage of the oxygen sensor. The oxygen sensor may output a rich voltage indicating a rich air/fuel ratio and the oxygen sensor may output a lean voltage indicating a lean air/fuel ratio.

Diagnostic systems may identify faults in the oxygen sensor based on a response time of the oxygen sensor. The response time of the oxygen sensor is the amount of time that the oxygen sensor takes to respond to a change in the oxygen levels at the oxygen sensor. The response time of the oxygen sensor typically increases over the life of the oxygen sensor. A faulty oxygen sensor may be identified when the response time of the oxygen sensor is greater than a predetermined time.

SUMMARY

A system according to the principles of the present disclosure includes a diagnostic execution module and a diagnostic disabling module. The diagnostic execution module diagnoses a fault in at least one of an oxygen sensor and a catalytic converter based on input received from the oxygen sensor. The diagnostic disabling module disables the diagnosing based on at least one of a temperature of the catalytic converter and a mass flow rate of air flowing through the catalytic converter.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
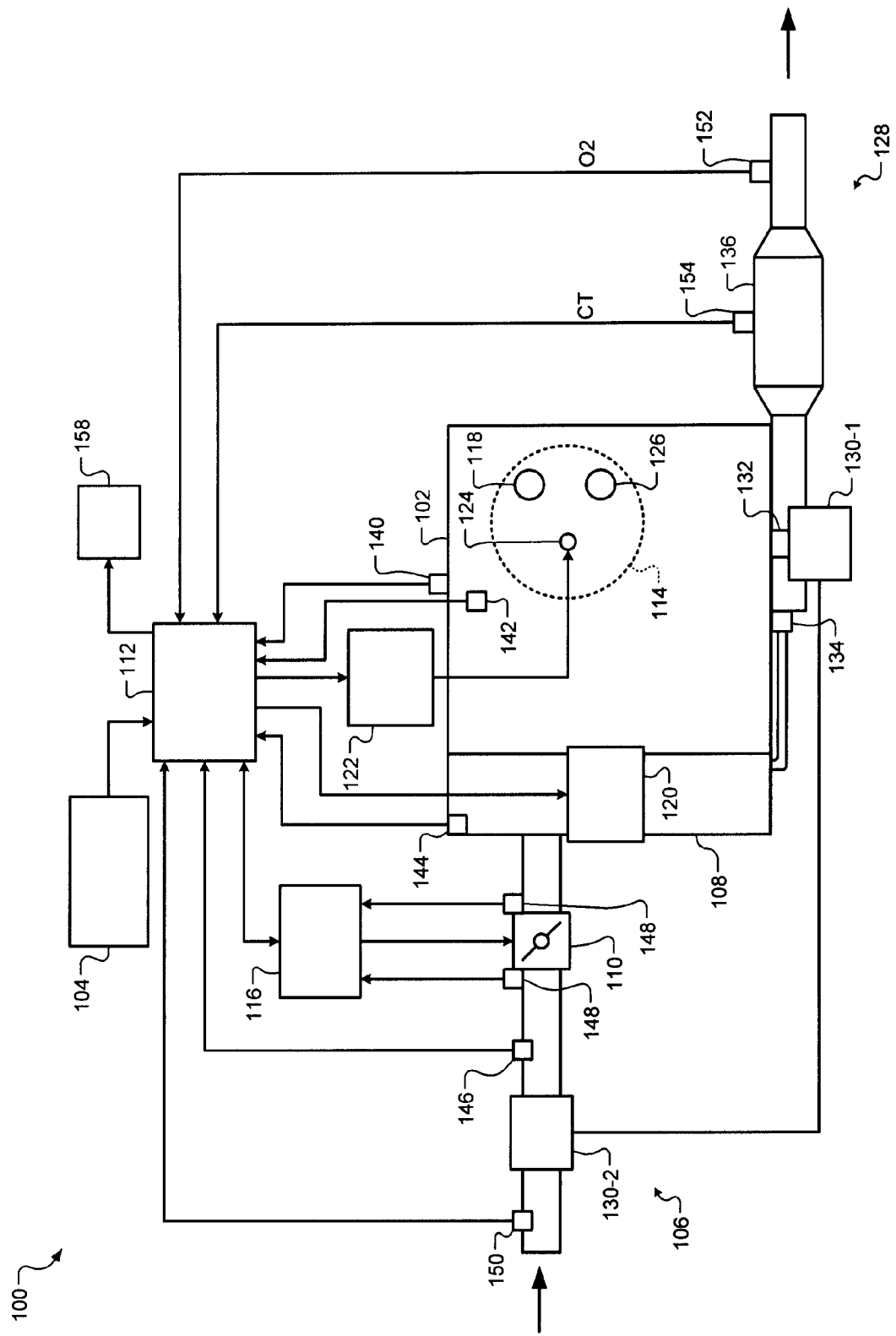
FIG. 1 is a functional block diagram of an example engine system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

When a catalytic converter is new, chemical reactions in the catalytic converter produce gases that may temporarily increase the response time of an oxygen sensor positioned downstream from the catalytic converter. For example, the response time of the oxygen sensor may increase from a normal value (e.g., 100 milliseconds (ms)) to a value that is five to ten times greater than the normal value (e.g., 500 ms). The chemical reactions are caused by elements that are present in a new catalytic converter and that are combusted and/or exhausted early in the life of the catalytic converter. When the elements are no longer present in the catalytic converter, the response time of the oxygen sensor may decrease to the normal value.

This temporary increase in the response time of the oxygen sensor may cause diagnostic systems to falsely identify faults in the oxygen sensor. The diagnostic systems may activate a service indicator when a fault is identified. Thus, falsely identified faults may increase warranty costs and decrease customer satisfaction.

A system and method according to the principles of the present disclosure delays certain diagnostic methods when a catalytic converter positioned upstream from an oxygen sensor is new. The diagnostic methods that are delayed include those that identify faults in the oxygen sensor based on the response time of the oxygen sensor. The period of the delay may be based on the temperature of the catalytic converter (i.e., the catalyst temperature) and/or the amount of airflow through the catalytic converter.

The delay period may be based on a total mass of air flowing through the catalytic converter when the catalyst temperature is greater than a predetermined temperature. The delay period may end when the total mass of air is greater than a predetermined mass. The predetermined temperature may breakdown and/or combust the elements in the catalytic converter that cause the response time of the oxygen sensor to temporarily increase. The predetermined mass may correspond to an amount of airflow through the catalytic converter that is sufficient to carry these elements away.

Referring to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into the engine 102 through an intake system 106. For example only, the intake system 106 may include an intake manifold 108 and a throttle valve 110. For example only, the throttle valve 110 may include a butterfly valve having a rotatable blade. An engine control module (ECM) 112 controls a throttle actuator module 116, which regulates opening of the throttle valve 110 to control the amount of air drawn into the intake manifold 108.

Air from the intake manifold 108 is drawn into cylinders of the engine 102. While the engine 102 may include multiple cylinders, for illustration purposes a single representative cylinder 114 is shown. For example only, the engine 102 may include 2, 3, 4, 5, 6, 8, 10, and/or 12 cylinders. The ECM 112 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 114. Therefore, two crankshaft revolutions are necessary for the cylinder 114 to experience all four of the strokes.

During the intake stroke, air from the intake manifold 108 is drawn into the cylinder 114 through an intake valve 118. The ECM 112 controls a fuel actuator module 120, which regulates fuel injection to achieve a desired air/fuel ratio. Fuel may be injected into the intake manifold 108 at a central location or at multiple locations, such as near the intake valve 118 of each of the cylinders. In various implementations (not shown), fuel may be injected directly into the cylinders or into mixing chambers associated with the cylinders. The fuel actuator module 120 may halt injection of fuel to cylinders that are deactivated.

The injected fuel mixes with air and creates an air/fuel mixture in the cylinder 114. During the compression stroke, a piston (not shown) within the cylinder 114 compresses the air/fuel mixture. The engine 102 may be a compression-ignition engine, in which case compression in the cylinder 114 ignites the air/fuel mixture. Alternatively, the engine 102 may be a spark-ignition engine, in which case a spark actuator module 122 energizes a spark plug 124 in the cylinder 114 based on a signal from the ECM 112, which ignites the air/fuel mixture. The timing of the spark may be specified relative to the time when the piston is at its topmost position, referred to as top dead center (TDC).

The spark actuator module 122 may be controlled by a timing signal specifying how far before or after TDC to generate the spark. Because piston position is directly related to crankshaft rotation, operation of the spark actuator module 122 may be synchronized with crankshaft angle. In various implementations, the spark actuator module 122 may halt provision of spark to deactivated cylinders.

Generating the spark may be referred to as a firing event. The spark actuator module 122 may have the ability to vary the timing of the spark for each firing event. The spark actuator module 122 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 126. The byproducts of combustion are exhausted from the vehicle via an exhaust system 128.

The engine system 100 may include a boost device that provides pressurized air to the intake manifold 108. For example, FIG. 1 shows a turbocharger including a hot turbine 130-1 that is powered by hot exhaust gases flowing through the exhaust system 128. The turbocharger also includes a cold air compressor 130-2, driven by the turbine 130-1, which compresses air leading into the throttle valve 110. In various implementations, a supercharger (not shown), driven by the crankshaft, may compress air from the throttle valve 110 and deliver the compressed air to the intake manifold 108.

A wastegate 132 may allow exhaust to bypass the turbine 130-1, thereby reducing the boost (the amount of intake air compression) of the turbocharger. The ECM 112 may modulate the boost of the turbocharger by controlling the position of the wastegate 132. In various implementations, multiple turbochargers may be controlled by the ECM 112. The turbocharger may have variable geometry, which may be controlled by the ECM 112.

An intercooler (not shown) may dissipate some of the heat contained in the compressed air charge, which is generated as the air is compressed. The compressed air charge may also have absorbed heat from components of the exhaust system 128. Although shown separated for purposes of illustration, the turbine 130-1 and the compressor 130-2 may be attached to each other, placing intake air in close proximity to hot exhaust.

The engine system 100 may include an exhaust gas recirculation (EGR) valve 134, which selectively redirects exhaust gas back to the intake manifold 108. The EGR valve 134 may be located upstream of the turbocharger's turbine 130-1. The EGR valve 134 may be controlled by the ECM 112.

The exhaust system 128 includes a catalytic converter 136 such as a three-way catalytic converter. When the air/fuel ratio of the engine 102 is lean, the catalytic converter 136 may store oxygen. When the air/fuel ratio is rich or stoichiometric, the catalytic converter 136 may reduce hydrocarbons using the stored oxygen.

The position of the crankshaft may be measured using a crankshaft position (CPS) sensor 140. The ECM 112 may determine the speed of the crankshaft (i.e., the engine speed) based on the crankshaft position. The temperature of the engine coolant may be measured using an engine coolant temperature (ECT) sensor 142. The ECT sensor 142 may be located within the engine 102 or at other locations where the coolant is circulated, such as a radiator (not shown).

The pressure within the intake manifold 108 may be measured using a manifold absolute pressure (MAP) sensor 144. In various implementations, engine vacuum, which is the difference between ambient air pressure and the pressure within the intake manifold 108, may be measured. The mass flow rate of air flowing into the intake manifold 108 may be measured using a mass air flow (MAF) sensor 146. In various implementations, the MAF sensor 146 may be located in a housing that also includes the throttle valve 110. The throttle actuator module 116 may monitor the position of the throttle valve 110 using one or more throttle position sensors (TPS) 148. The ambient temperature of air being drawn into the engine 102 may be measured using an intake air temperature (IAT) sensor 150.

An oxygen level in exhaust gas from the engine 102 may be measured using an oxygen (O2) sensor 152. The O2 sensor 152 may be positioned at an outlet of the catalytic converter or at another location downstream from the catalytic converter 136. A temperature of the catalytic converter 136 may be measured using a catalyst temperature (CT) sensor 154, which may be located at the catalytic converter 136.

The ECM 112 may use signals from the sensors to make control decisions for the engine system 100 and/or to identify a malfunction in the engine system 100. The ECM 112 may activate a malfunction indicator light (MIL) 158 to notify a driver of a malfunction in the engine system 100. Although the MIL 158 is referred to as a light, a medium other than light, such as sound or vibration, may be used to notify the driver. The ECM 112 may perform diagnostic methods to identify faults in the O2 sensor 152 and/or the catalytic converter 136 based on the response time of the O2 sensor. The ECM 112 may delay these diagnostic methods when the catalytic converter 136 is new.

Figure 2:
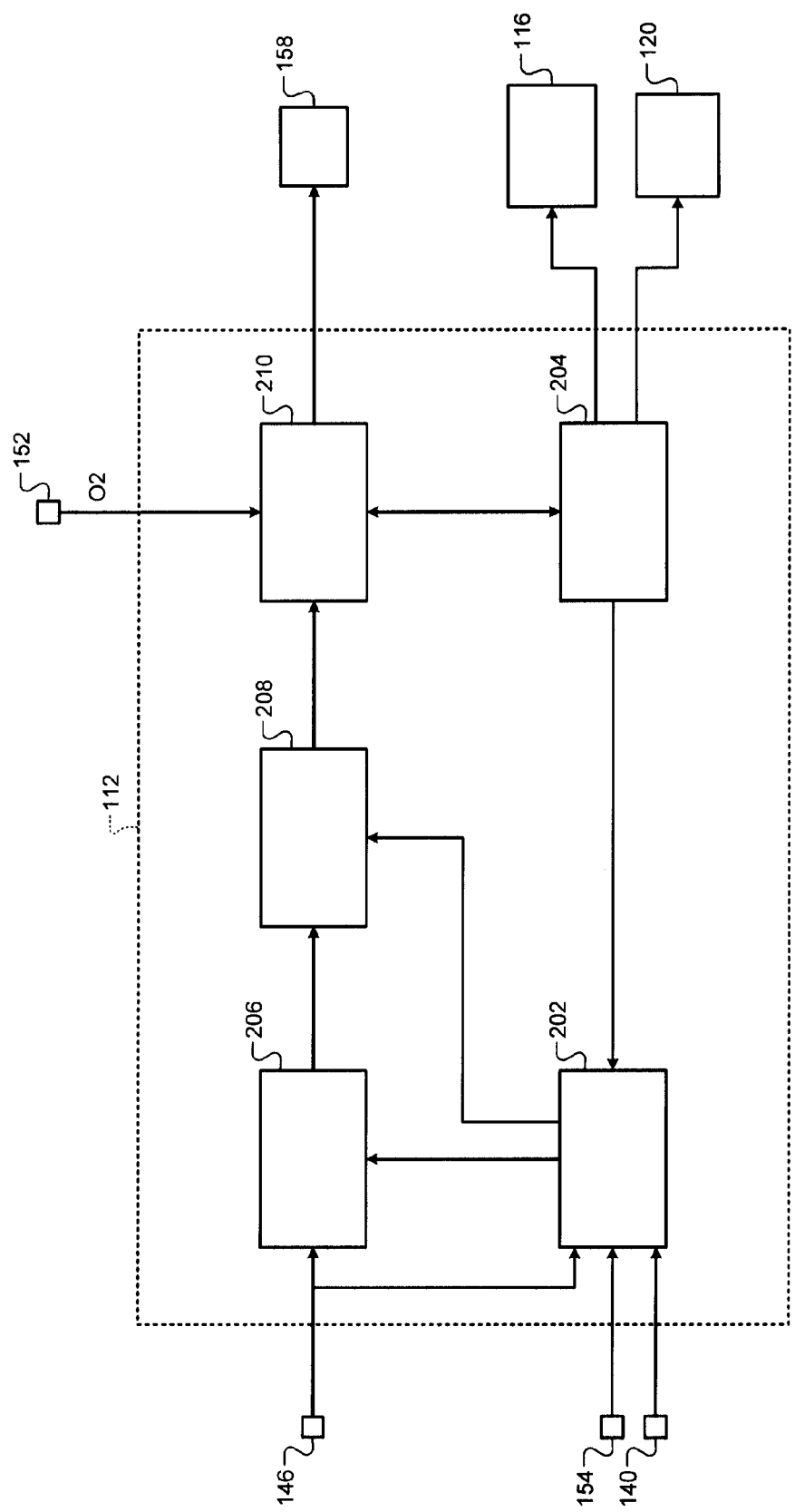
FIG. 2 is a functional block diagram of an example diagnostic system according to the principles of the present disclosure.

Referring to FIG. 2, the ECM 112 includes a temperature determination module 202. The temperature determination module 202 determines the temperature of the catalytic converter 136, which may be referred to as a catalyst temperature. The temperature determination module 202 may determine the catalyst temperature based on input from the CT sensor 154. Additionally, the temperature determination module 202 may determine the catalyst temperature based on the amount of heat energy dissipated into exhaust gas produced by the engine 102. The temperature determination module 202 may determine this amount using a mathematical model. The mathematical model may be embodied as an equation and/or a lookup table.

The temperature determination module 202 may determine a first amount of energy generated by combustion within the engine 102, and a second amount of energy transferred to a transmission. The temperature determination module 202 may determine a third amount of energy dissipated through an engine cooling system or to the environment, and a fourth amount of energy generated by exothermic reactions in the catalytic converter 136. The temperature determination module 202 may determine the amount of energy dissipated through the exhaust gas based on a difference between a first sum of the first and fourth amounts and a second sum of the second and third amounts.

The temperature determination module 202 may determine the first amount of energy generated by combustion based on engine operating conditions. The engine operating conditions may include intake airflow, engine speed, and fueling rate. The temperature determination module 202 may determine the intake airflow based on input received from the MAF sensor 146. The temperature determination module 202 may determine the engine speed based on input received from the CPS sensor 140.

The temperature determination module 202 may determine the fueling rate based on input received from an air/fuel (A/F) ratio control module 204. The A/F ratio control module 204 controls the air/fuel ratio of the engine by regulating the fueling rate and/or a throttle area. The A/F ratio control module 204 outputs a signal to the throttle actuator module 116 to regulating the throttle area. The A/F ratio control module 204 outputs a signal to the fuel actuator module 120 to regulate the fueling rate.

The temperature determination module 202 outputs the catalyst temperature to a mass determination module 206. The mass determination module 206 determines a total mass of air flowing through the catalytic converter 136 when the catalyst temperature is greater than a predetermined temperature. The predetermined temperature is a temperature that breaks down and/or combusts elements that are present in the catalytic converter 136 when the catalytic converter is new. These elements cause chemical reactions in the catalytic converter 136 producing gases that may temporarily increase the response time of the O2 sensor 152.

The mass determination module 206 determines the total mass based on input received from the MAF sensor 146. The mass determination module 206 may assume that the mass flow rate of air flowing through the catalytic converter 136 is equal to the mass flow rate of air flowing into the intake manifold 108 measured by the MAF sensor 146. The mass determination module 206 may integrate this mass flow rate with respect to time and increase the total mass based on the result of the integration. The mass determination module 206 may only increase the total mass when the catalyst temperature is greater than the predetermined temperature.

The mass determination module 206 outputs the total mass to a diagnostic disabling module 208. The diagnostic disabling module 208 delays certain diagnostic methods when the catalytic converter 136 is new. The diagnostic disabling module 208 may only delay the diagnostic methods that identify faults in the O2 sensor 152 and/or the catalytic converter 136 based on the response time of the O2 sensor 152. The diagnostic disabling module 208 may delay these diagnostics for a delay period.

The diagnostic disabling module 208 may start the delay period when a delay mode is activated. The delay mode may be activated when a vehicle is manufactured and/or when the catalytic converter 136 is replaced. The diagnostic disabling module 208 may be configured to activate the delay mode at the start of engine operation. The delay mode may also be activated when the catalytic converter 136 is replaced using, for example, a diagnostic service tool that communicates with the ECM 112. In various implementations, the mass determination module 206 may set the total mass to zero when the vehicle is manufactured and/or when the catalytic converter 136 is replaced. The mass determination module 206 may determine when the catalytic converter 136 is replaced based on input received from a diagnostic service tool.

The diagnostic disabling module 208 may stop the delay period based on the total mass of air flowing through the catalytic converter 136 when the catalyst temperature is greater than the predetermined temperature. The diagnostic disabling module 208 may stop the delay period when the total mass is greater than a predetermined mass. The predetermined mass corresponds to an amount of airflow through the catalytic converter 136 that is sufficient to carry away elements in the catalytic converter 136. The elements that are carried away include those that may temporarily increase the response time of the O2 sensor 152.

Alternatively, the diagnostic disabling module 208 may stop the delay period based solely on the airflow through the catalytic converter 136, independent from the catalyst temperature. In this regard, the mass determination module 206 may output an alternate mass of air that is determined by continuously integrating the airflow through the catalytic converter 136 with respect to time, regardless of the catalyst temperature. The diagnostic disabling module 208 may stop the delay period when the alternate mass is greater than the predetermined mass.

Additionally, the diagnostic disabling module 208 may stop the delay period based on the amount of time that the engine 102 is running (i.e., the engine runtime) when the catalyst temperature is greater than the predetermined temperature. The diagnostic disabling module 208 may determine the engine runtime based on the engine speed. The diagnostic disabling module 208 may receive the engine speed from the temperature determination module 202. The diagnostic disabling module 208 may stop the delay period when the engine runtime is greater than a predetermined period. The predetermined period may correspond to an amount of airflow through the catalytic converter 136 that is sufficient to carry away elements in the catalytic converter 136.

The diagnostic disabling module 208 outputs a signal to a diagnostic execution module 210 to delay diagnostic methods affected by the response time of the O2 sensor 152. The diagnostic execution module 210 executes these diagnostic methods to identify faults in the O2 sensor 152 and/or in the catalytic converter 136.

The diagnostic execution module 210 may identify faults in the O2 sensor 152 based on input received from the O2 sensor 152. The O2 sensor 152 may be a switching sensor that switches between a lean voltage indicating a lean air/fuel ratio and a rich voltage indicating a rich air/fuel ratio. The response time of the O2 sensor may be the amount of time that the O2 sensor 152 takes to switch from the lean voltage to the rich voltage or from the rich voltage to the lean voltage. The diagnostic execution module 210 may determine the response time of the O2 sensor 152 based on input received from the O2 sensor 152. The diagnostic execution module 210 may identify a fault in the O2 sensor when the response time is greater than a predetermined period.

The diagnostic execution module 210 may assume a constant exhaust flow rate through the exhaust system 128 and determine the response time of the O2 sensor 152 as described above. However, changes in the exhaust flow rate may affect the response time of the O2 sensor 152. For example, the response time of the O2 sensor 152 may decrease as the exhaust flow rate increases, and the response time of the O2 sensor 152 may increase as the exhaust flow rate decreases. Thus, the diagnostic execution module 210 may integrate the response time and normalize the response time with respect to the exhaust flow rate. The diagnostic execution module 210 may determine the exhaust flow rate based on input received from the MAF sensor 146.

The diagnostic execution module 210 may identify faults in the catalytic converter 136 based on input received from the O2 sensor 152 and the A/F ratio control module 204. The catalytic converter 136 may store oxygen when the A/F ratio of the engine 102 is lean, and oxygen stored in the catalytic converter 136 may be depleted as the oxygen is used to reduce hydrocarbon when the A/F ratio of the engine 102 is rich. The diagnostic execution module 210 may assess the ability of the catalytic converter 136 to store oxygen based on a depletion period between a time when the A/F ratio is switched from lean to rich and a time when the O2 sensor 152 reflects this switch.

The diagnostic execution module 210 may determine when the A/F ratio is switched from lean to rich based on input received from the A/F ratio control module 204. The diagnostic execution module 210 may determine when the output voltage of the O2 sensor 152 switches from rich to lean based on input received from the O2 sensor 152. The diagnostic execution module 210 may identify a fault in the catalytic converter 136 when the depletion period is less than a predetermined period. For example, the depletion period may be within a range between 7 seconds and 20 seconds when the catalytic converter 136 is functioning properly, and the depletion period may be approximately 2 seconds when the catalytic converter 136 is faulty.

The diagnostic execution module 210 may output a signal to the MIL 158 to activate the MIL 158 when a fault is identified in the O2 sensor 152 and/or in the catalytic converter 136. The diagnostic execution module 210 may output a signal to the A/F ratio control module 204 indicating when a fault is identified in the O2 sensor 152. In turn, the A/F ratio control module 204 may adjust the manner in which the A/F ratio of the engine 102 is controlled. For example, the A/F ratio control module 204 may normally control the A/F ratio based on input received from the O2 sensor 152. However, the A/F ratio control module 204 may control the A/F ratio independent from the output of the O2 sensor 152 when a fault is identified in the O2 sensor 152.

Figure 3:
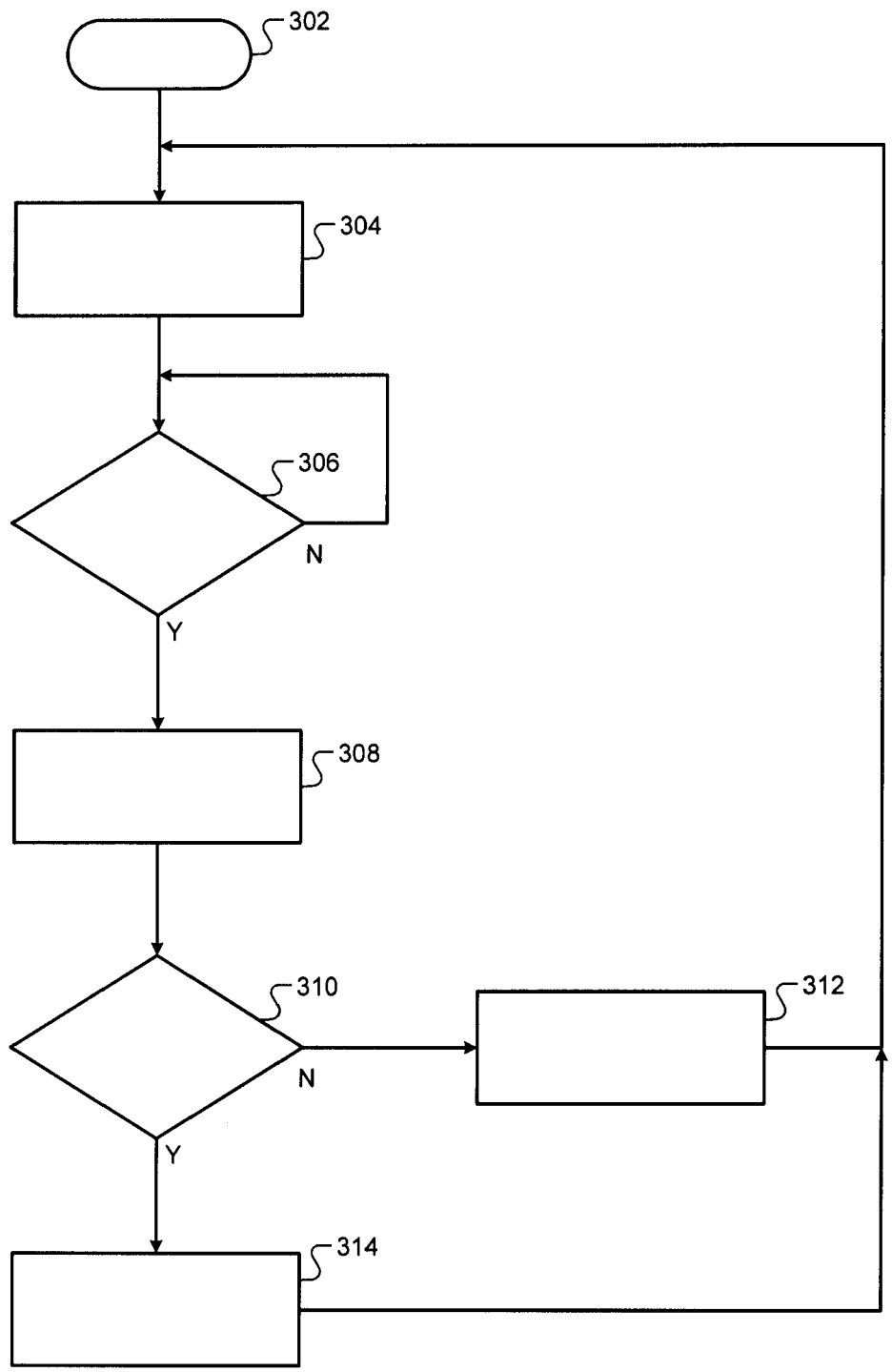
FIG. 3 is a flowchart illustrating an example diagnostic method according to the principles of the present disclosure.

Referring now to FIG. 3, a diagnostic method for an oxygen sensor positioned downstream from a catalytic converter begins at 302. The method begins at 302 when the catalytic converter is new. At 304, the method determines a catalyst temperature. The method may determine the catalyst temperature based on input received from a temperature sensor positioned at the catalytic converter. The method may determine the catalyst temperature based on a mathematical model that estimates the amount of energy input into exhaust gas flowing through the catalytic converter.

At 306, the method determines whether the catalyst temperature is greater than a first temperature. The first temperature may be greater than or equal to a minimum temperature that combusts and/or breaks down elements present in the catalytic converter when the catalytic converter is new. These elements yield chemical reactions producing gases that may increase the response time of the oxygen sensor. The first temperature may be predetermined. The method continues at 308 when the catalyst temperature is greater than the first temperature.

At 308, the method increases a total mass of air flowing through the catalytic converter. The method may determine the mass of air flowing through the catalytic converter by integrating airflow through the catalytic converter with respect to time. The method may increase the total mass by adding the integrated mass to the total mass.

At 310, the method determines whether the total mass is greater than a first mass. The first mass may correspond to a mass of air flowing through the catalytic converter that is sufficient to exhaust the elements in the catalytic converter that may cause the response time of the oxygen sensor to temporarily increase. The first mass may be predetermined and/or determined based on the catalyst temperature. For example, the first mass may be decreased based on a first amount by which the catalyst temperature is greater than the first temperature and/or the amount of time that the catalyst temperature is greater than the first temperature by the first amount.

The method continues at 312 when the total mass is less than the first mass. At 312, the method delays certain diagnostic methods. The method may only delay the diagnostic methods that identify faults in the oxygen sensor and/or in the catalytic converter based on the response time of the oxygen sensor. Thus, diagnostic methods that are necessary to meet certain emissions standards may still be performed while diagnostic methods that may result in falsely identified faults may be delayed.

The method continues at 314 when the total mass is greater than the first mass. At 314, the method allows all diagnostic systems to run, including those that identify faults in the oxygen sensor or the catalytic converter based on the response time of the oxygen sensor. The method may return to 304. Alternatively, the method may end. The method may begin again at 302 when the catalytic converter is replaced. In various implementations, the method may set the total mass to zero when a vehicle is manufactured and/or when the catalytic converter is replaced. The method may determine when the catalytic converter is replaced based on input received from a diagnostic service tool.

Figure 4:
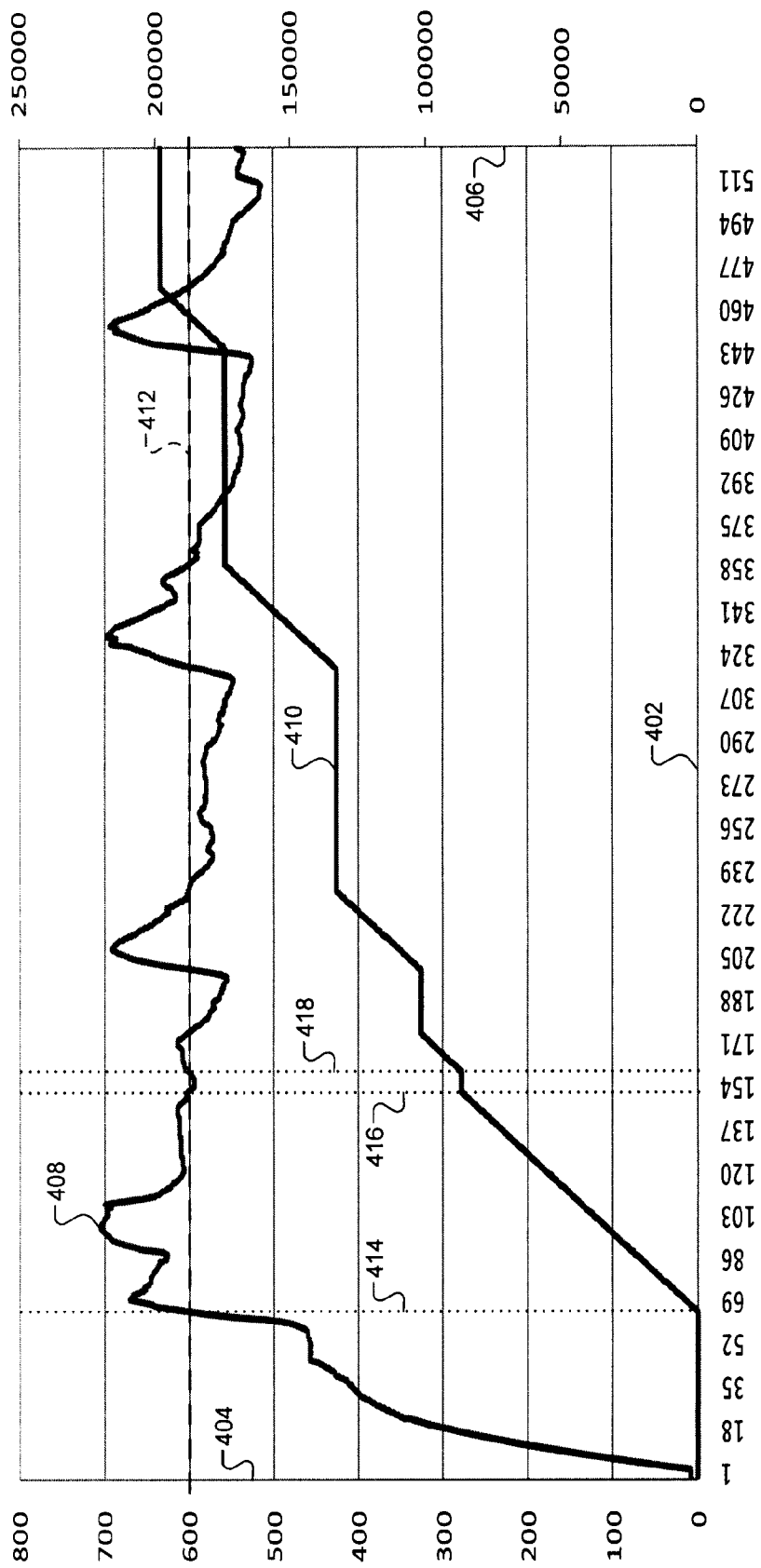
FIG. 4 is a graph illustrating example diagnostic signals according to the principles of the present disclosure.

Referring now to FIG. 4, an x-axis 402 represents engine runtime in seconds, a y-axis 404 represents temperature in degrees Celsius (° C.), and a y-axis 406 represents air mass in grams (g). A catalyst temperature 408 is plotted with respect to the x-axis 402 and the y-axis 404. A total mass 410 is plotted with respect to the x-axis 402 and the y-axis 406.

The total mass 410 is the total mass of air flowing through the catalytic converter when the catalyst temperature 408 is greater than a first temperature 412. The first temperature 412 is a predetermined temperature (e.g., 600° C.) that combusts and/or disintegrates elements that are present in a new catalytic converter. These elements yield chemical reactions producing gas that may increase the response time of an oxygen sensor positioned downstream from the catalytic converter.

At 414, the catalyst temperature 408 increases to a temperature that is greater than a first temperature 412, and therefore the total mass 410 starts to increase. The total mass 410 may only be increased when the catalyst temperature 408 is greater than the first temperature 412. For example, at 416, the catalyst temperature 408 drops to less than a first temperature 412, and therefore the total mass 410 stops increasing. However, at 418, the catalyst temperature 408 rises above the first temperature 412, and therefore the total mass 410 starts to increase again.

Diagnostic systems and methods that identify faults in the oxygen sensor and/or in the catalytic converter based on the response time of the oxygen sensor may be delayed until the total mass 410 is greater than a first mass (e.g., 720,000 g). The first mass corresponds to a sufficient amount of airflow through the catalytic converter to exhaust the elements that may increase the response time of the oxygen sensor.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
an actuator of an engine;
a first electronic circuit configured to diagnose a fault in at least one of an oxygen sensor and a catalytic converter based on input received from the oxygen sensor;
a second electronic circuit configured to disable the fault diagnosis based on a temperature of the catalytic converter and a mass flow rate of air flowing through the catalytic converter;
a third electronic circuit configured to determine a total mass of air flowing through the catalytic converter by integrating multiple values of the mass flow rate of air flowing through the catalytic converter with respect to time, wherein the second electronic circuit is configured to disable the fault diagnosis based on the total mass of air flowing through the catalytic converter; and
a fourth electronic circuit configured to adjust the actuator of the engine to adjust an amount of at least one of air and fuel provided to a cylinder of the engine, and thereby adjust an air/fuel ratio of the engine, based on the input received from the oxygen sensor.

2. The system of claim 1, wherein the second electronic circuit is configured to disable the fault diagnosis based on the total mass of air flowing through the catalytic converter when the temperature of the catalytic converter is greater than a first temperature.

3. The system of claim 2, wherein the second electronic circuit is configured to disable the fault diagnosis when the total mass is less than or equal to a first mass.

4. The system of claim 3, wherein the first temperature is predetermined to combust elements in the catalytic converter that cause a response time of the oxygen sensor to temporarily increase.

5. The system of claim 4, wherein the first mass is predetermined to remove the elements from the catalytic converter.

6. The system of claim 1, wherein the second electronic circuit is configured to disable the fault diagnosis based on an amount of time that an engine is running when the temperature of the catalytic converter is greater than a predetermined temperature.

7. The system of claim 1, further comprising a fifth electronic circuit configured to determine the temperature of the catalytic converter.

8. The system of claim 7, wherein the fourth electronic circuit is configured to determine the temperature of the catalytic converter based on input received from a temperature sensor located at the catalytic converter.

9. The system of claim 7, wherein the fourth electronic circuit is configured to determine the temperature of the catalytic converter using a mathematical model.

10. The system of claim 1, wherein the first and second electronic circuits include at least one of an Application Specific Integrated Circuit (ASIC), a processor and memory including one or more programs, and a combinational logic circuit.

11. The system of claim 1, wherein the fourth electronic circuit controls the actuator of the engine independent of the input received from the oxygen sensor when a fault is diagnosed in the oxygen sensor.

12. The system of claim 1, further comprising the actuator of the engine, wherein the actuator includes at least one of a fuel injector and a throttle valve.

13. A system comprising:
an actuator of an engine;
a first electronic circuit configured to diagnose a fault in at least one of an oxygen sensor and a catalytic converter based on input received from the oxygen sensor;
a second electronic circuit configured to disable the fault diagnosis based on:
   at least one of a temperature of the catalytic converter and a mass flow rate of air flowing through the catalytic converter; and
   a total mass of air flowing through the catalytic converter when the temperature of the catalytic converter is greater than a first temperature;
a third electronic circuit configured to:
   determine the total mass of air flowing through the catalytic converter by integrating multiple values of the mass flow rate of air flowing through the catalytic converter with respect to time; and
   set the total mass to zero based on at least one of: (i) when a vehicle is manufactured; and (ii) input received from a diagnostic service tool; and
a fourth electronic circuit configured to adjust the actuator of the engine to adjust an amount of at least one of air and fuel provided to a cylinder of the engine, and thereby adjust an air/fuel ratio of the engine, based on the input received from the oxygen sensor.

14. The system of claim 13, wherein the fourth electronic circuit controls the actuator of the engine independent of the input received from the oxygen sensor when a fault is diagnosed in the oxygen sensor.

15. The system of claim 13, further comprising the actuator of the engine, wherein the actuator includes at least one of a fuel injector and a throttle valve.

16. A method comprising:
diagnosing a fault in at least one of an oxygen sensor and a catalytic converter based on input received from the oxygen sensor;
measuring at least one of a temperature of the catalytic converter and a mass flow rate of air flowing through the catalytic converter;
determining a total mass of air flowing through the catalytic converter by integrating multiple values of the mass flow rate of air flowing through the catalytic converter with respect to time;
disabling the fault diagnosis based on the temperature of the catalytic converter, the mass flow rate of air flowing through the catalytic converter, and the total mass of air flowing through the catalytic converter; and
adjusting an actuator of an engine to adjust an amount of at least one of air and fuel provided to a cylinder of the engine, and thereby adjust an air/fuel ratio of the engine, based on the input received from the oxygen sensor.

17. The method of claim 16, further comprising disabling the fault diagnosis based on the total mass of air flowing through the catalytic converter when the temperature of the catalytic converter is greater than a first temperature.

18. The method of claim 17, further comprising disabling the fault diagnosis when the total mass is less than or equal to a first mass.

19. The method of claim 18, wherein the first temperature is predetermined to combust elements in the catalytic converter that cause a response time of the oxygen sensor to temporarily increase.

20. The method of claim 19, wherein the first mass is predetermined to remove the elements from the catalytic converter.

21. The method of claim 16, further comprising disabling the fault diagnosis based on an amount of time that an engine is running when the temperature of the catalytic converter is greater than a predetermined temperature.

22. The method of claim 16, further comprising determining the temperature of the catalytic converter.

23. The method of claim 22, further comprising determining the temperature of the catalytic converter based on input received from a temperature sensor located at the catalytic converter.

24. The method of claim 22, further comprising determining the temperature of the catalytic converter using a mathematical model.

25. The method of claim 16 further comprising controlling the actuator of the engine independent of the input received from the oxygen sensor when a fault is diagnosed in the oxygen sensor.

26. A method comprising:
diagnosing a fault in at least one of an oxygen sensor and a catalytic converter based on input received from the oxygen sensor;
measuring at least one of a temperature of the catalytic converter and a mass flow rate of air flowing through the catalytic converter;
determining a total mass of air flowing through the catalytic converter by integrating multiple values of the mass flow rate of air flowing through the catalytic converter with respect to time;
disabling the fault diagnosis based on:
   at least one of the temperature of the catalytic converter and the mass flow rate of air flowing through the catalytic converter; and
   the total mass of air flowing through the catalytic converter when the temperature of the catalytic converter is greater than a first temperature;
setting the total mass to zero based on at least one of: (i) when a vehicle is manufactured; and (ii) input received from a diagnostic service tool; and
adjusting an actuator of an engine to adjust an amount of at least one of air and fuel provided to a cylinder of the engine, and thereby adjust an air/fuel ratio of the engine, based on the input received from the oxygen sensor.

27. The method of claim 26 further comprising controlling the actuator of the engine independent of the input received from the oxygen sensor when a fault is diagnosed in the oxygen sensor.

* * * * *